(12) United States Patent
Cherlin et al.

(10) Patent No.: US 12,487,371 B2
(45) Date of Patent: Dec. 2, 2025

(54) RADIATION DETECTION SYSTEM

(71) Applicant: KROMEK LIMITED, Sedgefield (GB)

(72) Inventors: Alexander Cherlin, Newcastle Upon Tyne (GB); Ian Radley, Durham (GB)

(73) Assignee: KROMEK LIMITED, Sedgfield (GB)

( * ) Notice: Subject to any disclaimer, the term of this patent is extended or adjusted under 35 U.S.C. 154(b) by 516 days.

(21) Appl. No.: 17/909,114

(22) PCT Filed: Mar. 5, 2021

(86) PCT No.: PCT/GB2021/050557
§ 371 (c)(1),
(2) Date: Sep. 2, 2022

(87) PCT Pub. No.: WO2021/176232
PCT Pub. Date: Sep. 10, 2021

(65) Prior Publication Data
US 2023/0161054 A1    May 25, 2023

(30) Foreign Application Priority Data

Mar. 6, 2020   (GB) ..................................... 2003333

(51) Int. Cl.
*G01T 1/29*       (2006.01)
*G01T 1/161*      (2006.01)
(Continued)

(52) U.S. Cl.
CPC .......... *G01T 1/1618* (2013.01); *G01T 1/2985* (2013.01); *H04B 10/2941* (2013.01); *H10F 77/123* (2025.01)

(58) Field of Classification Search
CPC ..... G01T 1/1618; G01T 1/2985; G01T 1/295; H04B 10/2941; H10F 77/123
See application file for complete search history.

(56) References Cited

U.S. PATENT DOCUMENTS 5,245,191 A      9/1993   Barber et al.
2004/0239941 A1  12/2004  Schramm et al.
(Continued)

FOREIGN PATENT DOCUMENTS

JP    2005208057 A    8/2005
JP    2011085418 A    4/2011
(Continued)

OTHER PUBLICATIONS

United Kingdom Intellectual Property Office, Search Report, Sep. 3, 2020, 5 pages, European Patent Office.
(Continued)

*Primary Examiner* — Robert H Kim
*Assistant Examiner* — Christopher J Gassen
(74) *Attorney, Agent, or Firm* — FERENCE & ASSOCIATES LLC

(57) ABSTRACT

A method of detecting radiation from a source and a radiation detection system embodying the principles of the method are described. The method comprises: positioning a detector to receive radiation from the source; applying a multiplexing transformation to radiation from the source to create complexity in three dimensions in the pattern of radiation from the source; receiving a plurality of responses each being a response to an interaction with incident radiation occurring within the detector; determining, for each of the plurality of responses, a characteristic of the interaction, wherein the characteristic comprises at least a position in three dimensions of the interaction within the detector; processing the said plurality of responses in accordance with the determined position in three dimensions of each interaction within the detector and drawing inferences therefrom regarding the pattern of radiation from the source.

19 Claims, 3 Drawing Sheets

(51) Int. Cl.
    *H04B 10/294*     (2013.01)
    *H10F 77/123*     (2025.01)

(56) References Cited

U.S. PATENT DOCUMENTS

| | | |
|---|---|---|
| 2006/0108509 A1 | 5/2006 | Frangioni et al. |
| 2015/0381958 A1 | 12/2015 | Zalevsky et al. |

FOREIGN PATENT DOCUMENTS

| | | |
|---|---|---|
| JP | 2014194375 A | 10/2014 |
| WO | WO2007120643 A2 | 10/2007 |

OTHER PUBLICATIONS

ISA/EP, European Patent Office, International Search Report, May 27, 2021, 12 pages, European Patent Office.

L. Guerin et al., "A New Architecture for Pixellated solid state gamma camera used in nuclear medicine", 2006 IEEE Nuclear Science Symposium Conference Record, 2006, 5 pages, IEEE Digital Library.

RADIATION DETECTION SYSTEM

The present application is a National Phase Entry of PCT International Application No. PCT/GB2021/050557, which was filed on Mar. 5, 2021, and which claims priority to Application No. 2003333.8 filed in Great Britain on Mar. 6, 2020, the contents of which are hereby incorporated by reference.

The invention relates to a radiation detection system for the detection of radiation from a source, for example a radio isotope source, and in particular relates to a system adapted for the detection of radiation from a source where the source creates a low signal at the detector. The invention additionally relates to a method for the detection of radiation from such a source.

INTRODUCTION

A wide range of scenarios exists where it might be desirable to obtain more accurate information about radiation which is being emitted from a source and received at a detection system. In particular, a wide range of scenarios exists in which it might be desirable to resolve the information, for example spatially and/or spectroscopically, to provide additional information about the source and/or about materials through which the radiation has passed through between source and detector.

Such scenarios include, but are not limited to, scenarios where a source and detector are deliberately spaced apart, and radiation emitted from high activity areas in the test object, is measured at the detector to determine information in respect of the test object.

Examples of such latter scenarios include nuclear medicine imaging methods, where radiation from a radioisotope source is caused to pass to a part of the body of a subject under investigation, and where spatially registered information about the radiation received at a remote detector is used to obtain information regarding the structure and/or the real time physiological function of that part of the patient's anatomy, and for example to build up an image of that structure and/or physiological function. However, discussion of such applications is by way of example only, and the invention is not limited to medical or imaging applications.

The principles of the invention find particular application where the signal from the source is relatively low, and the signal of resolvable data from the relatively smaller number of particles of radiation emitted from the source incident upon a detector is consequently reduced, making it more difficult to resolve meaningful information from background. Such considerations are likely to apply in particular in medical applications, where there is a clear imperative to minimise the radiation dose experienced by the subject under test. Again therefore, nuclear medicine imaging provides a good example of a technology in which the principles of the invention might be advantageously applicable.

However, the advantages of the invention in relation to the resolution of higher level information from low-level signals apply generally to all cases where a low signal from the source needs to be resolved. An example of a non-medical application where a low signal is expected might be in the inspection of nuclear facilities using portable gamma cameras.

The advantages of the invention may accrue in both analogous and different ways in situations where reconstruction of images might be required and where reconstruction of images is unnecessary or undesirable.

An example of an established nuclear medicine imaging technique is single-photon emission computed tomography (SPECT) which is a nuclear medicine tomographic imaging technique using gamma rays. The technique requires the delivery into the patient, for example via the bloodstream, of a gamma-emitting radioisotope. In a typical application, the radioisotope is bound to a specific ligand, allowing it to be carried to and bound within a place of interest in the body of the subject under investigation.

The radioisotope emits gamma rays which passes through the tissue of the subject under investigation and can be detected at a suitable detector, and for example by a gamma camera. SPECT imaging by the gamma camera acquires multiple two-dimensional images which are then built up into a three-dimensional dataset using a standard tomographic reconstruction technique.

Similar principles are employed in positron-emission tomography (PET). In this case a positron-emitting radioisotope, again typically as part of a radioligand, is introduced into the body. In this case, the emitted positron is locally annihilated, and the system detects the pairs of gamma rays emitted indirectly by this annihilation event.

Both techniques are particularly powerful, allowing not merely imaging of the relevant part of the body but active functional imaging of biological processes.

A known technique for imaging of breast tissue, for example to detect abnormalities that might lead to the early detection of breast cancer, is mammography. Standard mammography uses X-rays to create images. These images are then analyzed for abnormal findings and in particular for characteristic dense masses that might indicate potential tumours for example. These patients are then referred for further, usually more invasive, testing. Standard mammography is thus a widely adopted first stage screening technique.

However, the response of normal but relatively dense breast tissue to the low-energy x-rays can be similar to that of the sort of masses that might be indicative of potential development of many commonplace tumours, and the ability of the technique to distinguish in those patients which have a high proportion of high density breast tissue is consequently reduced.

Molecular breast imaging (MBI) is a developed nuclear medicine imaging technique that utilises many of the above principles of SPECT-type techniques. A radioisotope source, again typically bound to a suitable ligand to cause it locate within breast tissue, is introduced into the subject under investigation. A suitable system of small semiconductor-based gamma cameras in a configuration generally corresponding to that for a more conventional mammogram is used to detect radiation from the source after it has passed through the breast tissue. The technique can be particularly effective at detecting incipient tumours, as it can differentiate structures and physiological activity. It does generally subject the patient under investigation to higher overall radiation dose however, which has tended to limit its application as a first stage screening technique.

In all nuclear medicine imaging techniques, there is a clear imperative to keep the radioactivity of the source, and the consequent dose of radiation received by the subject under investigation subject under investigation, as low as possible. The resultant low signal to be collected at the detector presents particular problems in relation to both detection and resolution of data.

A factor that affects the required source signal is the efficiency of detection. In particular in relation to imaging techniques, to get the required x, y resolution a detection system is required that distinguishes between a plurality of separately addressable detection points or regions in the x and y directions. In an imaging system, each point or region may correspond to a pixel in a reconstructed image, and may generally be referred to as a pixel on the detector. To achieve effective x, y resolution in the resultant image a detection system is required that distinguishes between the "pixels" in the x and y directions in a manner that allows an effective signal to be obtained for each of the separately addressable "pixels" in the x and y directions individually.

Radiation detectors of any type, and in particular the solid-state detectors which are widely used in conventional medical imaging applications, are usually characterised by the feature that their efficiency is dependent upon thickness. It need be not a trivial relationship, but in most cases the thicker the detector, the greater the efficiency. Conventionally, the efficiency of the solid-state detectors which are widely used in conventional medical imaging applications is enhanced by provision of a suitable depth in a z-direction or orthogonal to the x, y of the detection surface.

However, in order to maintain positional registration in x, y in a detector which also has substantial depth in a z direction, it is necessary to collimate the signal emitted from the source incident upon the detector. The quality and usefulness of any image in a nuclear medicine imaging technique is seriously affected by the collimator structure. It is normal to use a collimator such as a parallel-hole collimator with a very low spread angle between a source and a gamma camera or other detector which creates a registration in the signal between the source and detector that approaches a one to one registration in the x, y plane.

The effective development of instrumentation for nuclear medicine imaging embodying techniques such as SPECT, PET or MBI is therefore a compromise between the requirement for effective collimation with substantially complete one to one registration in an x, y direction, for example using parallel hole collimators with a very low spread angle, the consequent reduction in signal by the collimator, and the requirement for the lowest radiation dose source possible.

There is a general desire to provide for alternative detection systems and methods which allow for the resolution of information concerning radiation from a low-signal source.

There is a particular desire to provide such alternatives which might have applicability in nuclear medicine imagine, and which might address those conflicting considerations in a more effective and efficient way and provide for improved resolution of physiologically relevant data from a patient and/or reduced radiation dose levels.

SUMMARY OF INVENTION

In accordance with the invention in a first aspect, a method of detecting radiation from a source comprises:
positioning a radiation detector to receive radiation from the source;
applying a multiplexing transformation to radiation from the source to create complexity in three dimensions in the pattern of radiation from the source;
receiving a plurality of responses each being a response to an interaction with incident radiation occurring within the detector;
determining, for each of the plurality of responses, a characteristic of the interaction, wherein the characteristic comprises at least a position in three dimensions of the interaction within the detector;
processing the said plurality of responses in accordance with the determined position in three dimensions of each interaction within the detector and drawing inferences therefrom regarding the pattern of radiation from the source.

The invention is distinguished by three steps:
transforming the incident radiation to add complexity in three dimensions;
measuring that complexity at a detector by determining, for each radiation interaction in the detector, position in three dimensions of the interaction within the detector;
deconvolving the resultant pattern of interactions within the detector to reconstruct a picture of the pattern of radiation from the source and thereby to allow inferences to be drawn about the source from that reconstruction.

The invention is distinctly characterised over the prior art discussed above by the deliberate introduction of complexity in three dimensions to the pattern of radiation from the source; the detection of this three dimensional complexity; and the use of this detected complexity at the processing stage.

That is to say, it is inherent in the invention that the multiplexed pattern of radiation has an introduced three dimensional complexity not only in a detector x, y plane but also in a detector z direction, that the detector localises each interaction not only in a detector x, y plane but also in a detector z direction, and that this three dimensional dataset is then deconvolved to reconstruct a picture of the pattern of radiation from the source.

It should be understood that reference herein to a multiplexing transformation is to be considered to have the general meaning indicated, that when applied to radiation from the source it is effective to create complexity in three dimensions in the pattern of radiation from the source, which three dimensional complexity is exploited in the subsequent stages of the invention by its purposeful detection at the detector and by the use of this detected complexity at the processing stage. None of the more precise and limited meanings of multiplexing/multiplexer that might be applied as terms of art in particular fields such as telecommunications and computer network data transmission, electronics and signal processing, or other arts, should be inferred.

The function of this multiplexing transformation to retain more complexity in the data, its purposeful detection, and the subsequent deconstruction of that more complex data, can be contrasted with that of a parallel hole collimator or similar filter in conventional imaging apparatus, for example for nuclear medicine tomography imaging.

In such prior art, the approach conventionally employed is to restrict the complexity of the radiation from the source to two dimensions corresponding to a detector x, y plane by monotonic collimation and to detect interactions localised in the detector in an x, y plane, for example pixel by pixel. In the prior art approach, variation of x, y position with z is seen not as a feature to be exploited but as a problem to be eliminated.

In conventional nuclear medicine imaging, a radioisotope administered to a subject under investigation is localised in the part of the subject's body to be examined, and for example in the case of MBI in the breast tissue, and radiation from the source is detected at the detector and used to reconstruct information about the tissue through which the radiation has passed which is directly spatially registered in x, y directions and is for example used to build up an image, and in the case of tomographic method successive layers of image.

This requires use of a pixelated detector and maintenance of a substantially one to one registration in an x, y direction between the source radiation and the separately addressable pixels on the detector surface.

Such pixelated detectors, in which the detector is effectively subdivided into a plurality of detection portions arrayed in a detector x, y direction, are of course familiar. Detectors may readily be pixelated for example by provision of discrete sub units, appropriate processing electronics, or a combination of the two.

Radiation detectors of the type envisaged for the invention are usually characterised by the feature that their efficiency is dependent upon their thickness. The efficiency of the detector is usually enhanced by provision of a suitable depth. It follows that each detection portion or "pixel" of such a detector also has a substantial depth in a third orthogonal or z-direction. The depth is likely to be such that for a given detection portion the depth in the z-direction is a number of times greater than the lateral extent of the detection portion in x, y (that is, the "pixel" size in x, y).

In conventional systems such as above discussed that seek to maintain a close 1 to 1 positional registration in x, y between source and detector this can create a problem, as deeper level particle interactions may register in the "wrong" detection portion or pixel, and distort the resultant image.

Conventional systems therefore include a collimator or like filter between the source radiation and the detector in order to create this approximately one to one registration in x, y with the pixelated area of the detector. For example, a parallel hole collimator with a very narrow angular aperture is used. This is intended to maintain a substantially monotonic 1 to 1 positional registration in x, y in the radiation pattern as it passes from source to detector.

The parallel holes are given a sufficiently narrow angular aperture to create a substantially one to one registration directly between the source and individual pixels of the detector. This ensures that any photon which is detected at any depth in the detector is correctly registered to and associated with the pixel on the surface where the interaction occurs. Without this narrow angle of collimation, there would not be such a consistent registration between surface and depth interactions associated with each pixel, and a loss of resolution of the image would ensue.

A drawback of this is that a significant number of photons do not reach the detector. In a typical MBI system perhaps as few as 1 in $10^4$ photons are registered. Similar levels are typical for other SPECT-type techniques.

The consequence is that a much higher signal source of radiation, and in the case of medical imaging a consequent higher radiation dose into the patient's tissue, is required to get a satisfactory number of photon interactions at the detector to generate an image. The alternative, to relax the angle passed by the collimator, for example by using larger dimensioned holes, will lose resolution in the image.

The collimator thus, in the language of the invention, effects a transformation upon the radiation from the source to remove complexity in the third dimension from the pattern of radiation from the source and create data which is essentially monotonically fully positionally registered in x, y at the detector. Correspondingly in the case of an imaging system each pixel at the detector corresponds to and is used by the subsequent processing electronics to reconstruct directly a corresponding pixel in the image dataset.

The present invention by contrast is distinctly characterised by the use of a multiplexing transformation which intentionally adds some complexity in three dimensions to the radiation pattern, by the purposeful detection of this complexity in three dimensions at the detector, and by the provision of a processing module to reconstruct this more complex data and draw additional or alternative inferences as regards the radiation from the source, and in the case where the source radiation has passed through or emerged from an object under test such as a part of the body of a patient, to reconstruct information regarding the object under test/body from this more complex data.

As a result, the present invention takes a radically different approach to the apparent conflict that exists in the prior art between maintaining adequate signal/reducing dose and losing image contrast. It relies on the realisation that if the depth of each photon interaction, that is, the position in a z-direction within a deep detector, can also be resolved to some degree, a dataset may be produced in which each photon interaction can be localised positionally to some degree in all of the x, y and z co-ordinates, which may allow inferences to be drawn, and the dataset to be deconvolved by suitable reconstruction methods in a suitable processing and reconstruction module, which may obviate the need to collimate with an objective of near one to one x, y registration, and which may as a result significantly reduce the number of photons which are prevented from passing the filter and thus significantly increase the proportion of photons which pass the filter to be usefully collected at the detection module and meaningfully processed. An effective set of data may be collected at the detection module with a much lower inherent source level of radioactivity, and for example in the case of medical imaging a consequent lower radiation dose into the patient's tissue.

It will nevertheless be appreciated that some form of multiplexing transformation is required which adds a complexity to the pattern of radiation from the source which has some functional variation with distance. Without this additional complexity, there would be no pattern at all in the data for detected interactions at the detector even if it were resolved positionally in three dimensions as the invention envisages. Therefore, some form of multiplexing transformer or filter is used to introduce this complexity to the pattern of radiation from the source.

The multiplexing transformer or filter does not seek to introduce, as a conventional parallel hole collimator might do, a monotonic relationship between the order of radiation from the source and the order of radiation at the detector, and for example positioned at individual pixels on the detector. It does not seek to reduce complexity in the pattern to two dimensions only. Rather, it introduces a resolvable complexity in three dimensions to the radiation detected at the detector, which complexity in three dimensions may be detected by using a detector that detects depth of interaction and note merely x, y position, and may then in principle be resolved at the processing stage.

It is necessary to the method that a multiplexing transformation is performed on radiation from the source to create complexity in three dimensions in the pattern of radiation from the source.

In possible embodiments, the multiplexing transformation is effected in that radiation from the source is caused to pass through a multiplexing transformer or filter configured to create resolvable complexity in three dimensions to the pattern of radiation from the source as it passes the filter.

A suitable multiplexing filter may comprise a discrete structure positionable in use between a source and a detector and configured when so positioned to create resolvable complexity in three dimensions to the pattern of radiation from the source before it is incident upon the detector.

Additionally or alternatively a multiplexing filter may be combined with a detector and/or a detector may be provided which is adapted to perform the multiplexing transformation.

Such a multiplexing filter is not a monotonic collimator as in the prior art. It does not effect a transformation upon the radiation from the source to remove complexity in the third dimension from the pattern of radiation from the source and create data which is essentially monotonically fully positionally registered in x, y at the detector. It is necessary that there is some resolvable complexity in the radiation that has passed the multiplexing transformation, but that this resolvable complexity has a functional relationship in three dimensions to the source radiation.

A filter comprising a mere pair of pinholes would be sufficient with the resultant overlapping cones of radiation providing the necessary complexity. It is sufficient merely that there is not substantial monotonic correspondence in x, y between the signal incident upon the filter and the signal passed by filter as would be the case for a theoretically perfect parallel hole collimator.

Counterintuitively, the invention relies upon the realisation that provided each photon interaction at the detector is localised positionally not merely in x, y co-ordinates but also to a sufficient degree in a z-coordinate by determining the depth within the detector at which the interaction occurs, monotonic collimation is no longer necessary, nor even desirable, and instead a multiplexing filter may be used which passes a far greater proportion of incident photons from the source in combination with a suitable processing and reconstruction module to deconvolve the three-dimensional data and extract information accordingly.

In accordance with the invention the method comprises receiving a plurality of responses to a corresponding plurality of interactions with incident radiation occurring within the detector, and for each such response determining at least a position in three dimensions within the detector of the said interaction.

For example, the method of the invention comprises the use of a detector adapted or configured to enable an interaction with incident radiation occurring within the detector to be localised to an interaction position within the detector in three dimensions. The method in such a case includes a step of causing radiation from the source to be incident upon such a detector and performing the receiving and determining steps accordingly.

In some embodiments for example, the invention comprises the use of a detector comprising a three-dimensional voxel array, wherein the determining for each of the plurality of responses, a characteristic of the interaction including at least a position in three dimensions of the interaction comprises localising the said interaction to a particular voxel.

Preferably, the detector comprises a means to localise an interaction within the detector to each of an x and a y direction in a plane generally perpendicular to a direction of incident radiation, and a z direction comprising a depth within the detector in a direction generally orthogonal to the x, y plane.

For example, the radiation detector comprises a detection surface divided into a plurality of separately addressable detection portions defined positionally across the detection surface in each of two orthogonal directions, hereinafter an x-direction and a y-direction, whereby an interaction at the detection module of a particle of a radiation incident from the source may be localised positionally to a detection portion; and a depth in a third orthogonal direction, hereinafter a z-direction, the radiation detector being configured such that an interaction at the detection module of a particle of a radiation incident from the source may be further localised positionally to a depth in the z direction.

The method further comprises receiving and processing, for example at a suitable processing module in data communication with the radiation detector, radiation data from a successive plurality of particle interactions at the detector, each thereby localised positionally to a particular voxel and/or to x, y and z co-ordinates.

The principles of the invention may be applied to radiation of various types from various sources incident upon suitably matched detectors. The radiation preferably comprises high-energy radiation such as ionising radiation, for example high-energy electromagnetic radiation such as X-rays and/or gamma rays or subatomic particle radiation, and the detector system is adapted correspondingly to detect radiation of this type and in the appropriate spectrum.

In accordance with the invention in a further aspect, a radiation detection system for the detection of radiation from a source is provided comprising:
a detector;
a multiplexing transformer operable on radiation from the source to create complexity in three dimensions in the pattern of radiation from the source;
a processing module operable to:
receive a plurality of responses each being a response to an interaction with incident radiation occurring within the detector;
determine, for each of the plurality of responses, a characteristic of the interaction, wherein the characteristic comprises at least a position in three dimensions of the interaction within the detector;
process the said plurality of responses in accordance with the determined position in three dimensions of each interaction within the detector and drawing inferences therefrom regarding the pattern of radiation from the source.

The system is in particular a system adapted for the performance of the method of the first aspect, and preferred features of each aspect will be understood to be applicable to the other.

In particular, the multiplexing transformer is configured to be operable on radiation from the source, and is for example positionable to be so operable, so as to introduce a three dimensional complexity not only in a detector x, y plane but also in a detector z direction. In particular, the detector is configured to localise each interaction not only in a detector x, y plane but also in a detector z direction. In particular, the processing module is operable to collect the resultant three dimensional dataset and then deconvolve the same to reconstruct a picture of the pattern of radiation from the source.

The function of this multiplexing transformer to retain more complexity in the data, its purposeful detection, and the subsequent deconstruction of that more complex data, can be contrasted as above with that of the collimator or similar filter in conventional imaging apparatus, for example for nuclear medicine tomography imaging.

By the use of a multiplexing transformer which intentionally adds some complexity in three dimensions to the radiation pattern, by the purposeful detection of this complexity in three dimensions at the detector, and by the provision of a processing module to reconstruct this more complex data and draw additional or alternative inferences as regards the radiation from the source, and in the case where the source radiation has passed through or emerged from an object under test such as a part of the body of a patient, it is possible to reconstruct information regarding the object under test/body from this more complex data with a much lower inherent source level of radioactivity, and for example in the case of medical imaging a consequent lower radiation dose into the patient's tissue.

It will nevertheless be appreciated that some form of multiplexing transformation is required which adds a complexity to the pattern of radiation from the source which has some functional variation with distance. Without this additional complexity, there would be no pattern at all in the data for detected interactions at the detector even if it were resolved positionally in three dimensions as the invention envisages.

In some embodiments, a suitable multiplexing filter may comprise a discrete structure positionable in use between a source and a detector and configured when so positioned to create resolvable complexity in three dimensions to the pattern of radiation from the source before it is incident upon the detector.

Additionally or alternatively a multiplexing filter may be combined with a detector and/or a detector may be provided which is adapted to perform the multiplexing transformation.

A filter comprising a mere pair of pinholes would be sufficient with the resultant overlapping cones of radiation providing the necessary complexity. It is sufficient merely that there is not substantial monotonic correspondence in x, y between the signal incident upon the filter and the signal passed by filter as would be the case for a theoretically perfect parallel hole collimator.

Preferably, the detector is adapted or configured to enable an interaction with incident radiation occurring within the detector to be localised to an interaction position within the detector in three dimensions.

In some embodiments for example, the detector is a voxel detector comprising a three-dimensional voxel array. In such a case, determining, for each of the plurality of responses, a characteristic of the interaction including at least a position in three dimensions of the interaction comprises localising the said interaction to a particular voxel.

In some embodiments, the detector comprises a means to localise an interaction within the detector to each of an x and a y direction in a plane generally perpendicular to a direction of incident radiation, and a z direction comprising a depth within the detector in a direction generally orthogonal to the x, y plane.

For example, the detector comprises a detection surface divided into a plurality of separately addressable detection portions defined positionally across the detection surface in each of two orthogonal directions, hereinafter an x-direction and a y-direction, whereby an interaction at the detection module of a particle of a radiation incident from the source may be localised positionally to a detection portion; and a depth in a third orthogonal direction, hereinafter a z-direction, the radiation detector being configured such that an interaction at the detection module of a particle of a radiation incident from the source may be further localised positionally to a depth in the z direction.

It is in consequence a fundamental and necessary feature of the invention that the detector is configured to enable a determination of a depth of interaction (that is, a dimension in a z-direction) at which each photon interaction occurs. This may be achieved in any suitable way by combination of materials, structural features and processing electronics.

For example, a detector may be fabricated from a material that inherently allows depth of interaction information to be extracted, such as a bulk crystal cadmium telluride type solid state semiconductor detector. The materials making up the semiconductor detector are for example selected from cadmium telluride, cadmium zinc telluride (CZT), cadmium manganese telluride (CMT) and alloys thereof, and for example comprise crystalline $Cd_{1-(a+b)}Mn_aZn_bTe$ where $a+b<1$ and a and/or b may be zero. Bulk single crystal detectors may be particularly preferred. Advantageously, detectors of this type are effective in being inherently adapted for the determination of a depth of interaction for incident radiation events. Advantageously, detectors of this type exhibit high sensitivity for x-rays and gamma-rays across a broad spectral range and with better energy resolution than scintillation detectors, and thus offer the potential to exploit the principles of the invention in a wide range of scenarios and with a range of radiation sources.

Additionally or alternatively, the detector may comprise multiple discrete layers in a z-direction of suitable detector materials. For example, multi-layer scintillator detectors may be suitable for implementation of the invention.

The primary advantage of the invention lies in the ability, subject to suitable reconstruction techniques, to derive additional information, if necessary for imaging, from a set of photon interactions which is resolved in three dimensions to x, y, z co-ordinates, and which as a result suffers much reduced loss of signal as it passes the filter compared with monotonic collimation. As a result, the invention is particularly suited to the extraction of information in any scenario where the source is a low signal source, whether this is an inherent feature of the source, or desirable feature for the source for example in medical applications.

A multiplexing filter suitable for the performance of the invention comprises any device which will differentially pass only some of the incident radiation on a directionally registered basis to create a pattern which is at least in part a function of position in x, y co-ordinates, to create some registration between x, y in the radiation emitted from the source and x, y at the detector, but which is not designed to produce a substantially one to one registration in x, y.

For example, a multiplexing filter may be a collimator, but not a collimator having design registration approximating to monotonic between x, y in the radiation emergent from the source and x, y at the detector. Suitable collimators might comprise for example one or two dimensional arrays of apertures, for example pinhole arrays, and arrays of parallel holes and slits, with relatively wide angular acceptance.

Other multiplexing filters may include suitably coated optics.

At its simplest, even a pair of pinholes may introduce useful complexity, and an example of a multiplexing filter based on such a simple principle is discussed hereinbelow by way of illustration, but any suitable design that introduces some complexity in three dimensions to the pattern of radiation from the source as it passes the filter and that does not create substantial monotonic correspondence in x, y between the signal from the source incident upon the filter and the signal passed by filter might be suitably combined with appropriate deconvolution techniques in the processing module to derive useful information from the more complex data received and collected at the detection module. Appropriate designs of multiplexing filter will readily be combined with appropriate deconvolution techniques to solve particular problems, both in cases where use of the deconvolved data for the reconstruction of images might be required and where reconstruction of images is unnecessary or undesirable.

In a possible embodiment, the method is applied as a method for collecting radiation data after transmission through a test object, for example for imaging of the test object, and the system is adapted to be uses as a system for collecting radiation data after transmission through a test object.

In such a case the method additionally comprises:
disposing a test object between the source and the multiplexing filter;
causing radiation from the source to be incident upon the test object, and causing at least some of the radiation emergent therefrom to pass the filter and be incident upon the detection module.

Each of a successive plurality of particle interactions collected at the detection module after transmission through the test object is localised positionally in x, y and z co-ordinates.

In a possible embodiment the data for the successive plurality of particle interactions so localised is processed to generate an image dataset. The method may further comprise generating an image and optionally further displaying the image. The system may further comprise an image generation module for generating an image and an image display. The method may further comprise generating successive images as a tomographic reconstruction. The system may further comprise a tomographic reconstruction module to effect the same.

In a preferred embodiment, the method is applied as a method of medical examination and for example medical imaging, and the test object is a part of the body of a test subject.

Additionally or alternatively the data for the successive plurality of particle interactions so localised may be processed to triangulate the position of a substructure within the test object.

BRIEF DESCRIPTION OF DRAWINGS

The invention will now be described by way of example only with reference to FIGS. 1 to 4 of the accompanying drawings, in which.

DETAILED DESCRIPTION

Figure 1:
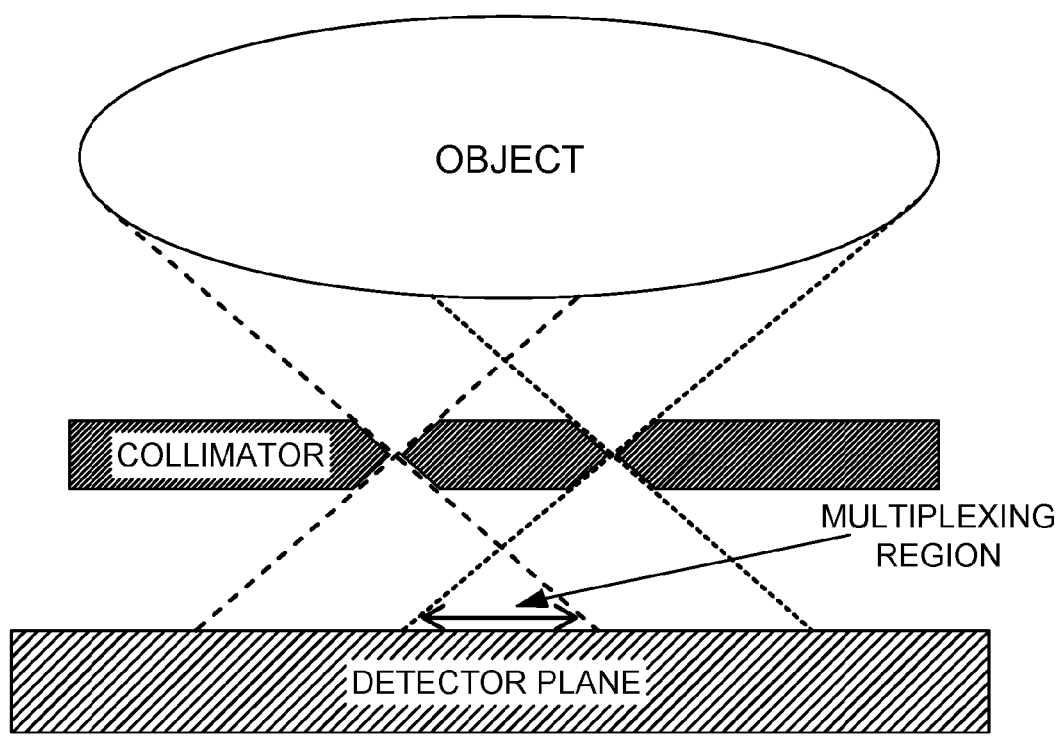
FIG. 1 illustrates the principle of multiple-pinhole multiplexing, showing a pinhole collimator being an example of a multiplexing filter for application in the system and method of the invention.

FIG. 1 illustrates the principle often referred to as multiple-pinhole image multiplexing, showing a pinhole collimator being used to project an image from a sour5ce to a detection plane. At its simplest, even a pair of pinholes may introduce useful complexity, and the principle is discussed herein by way of illustration.

Each pinhole will create a partial image of the object on the detector plane with a possible overlap of those images depending on the distance between the pinholes and their geometry. The reconstruction of the full object image from the detector data will be comprised of putting together all individual images created by each pinhole with appropriate adjustment of shifts and projection angles.

The overlapping on the partial images is usually referred as multiplexing. It is typically seen as an imaging defect, or at least as an imaging artefact to be accommodated. Naturally, the bigger the multiplexing regions are, the bigger the resulting reconstructed object image artefact will be. If one tries to increase the efficiency of the collimator (i.e. to increase the number of photons getting through it to the detector), then there would be a hard limit on the maximum efficiency.

However, when a pinhole collimator is used a multiplexing filter for application in the system and method of the invention, allowing a certain amount of multiplexing will make it possible to increase the efficiency even further if a detector is used that allows data to be obtained for depth of interaction in a detector z direction and not merely data for the x, y position on the plane of the detection surface.

The multiplexing filter does not seek to introduce, as a conventional parallel hole collimator might do, a monotonic relationship between the order of rays of radiation from the source and the order of radiation of rays positioned at individual pixels on the detector. It is necessary that there is some resolvable complexity in the radiation that has passed the multiplexing filter. In the embodiment the overlapping cones of radiation providing the necessary complexity.

The current invention then utilises data obtained for depth of interaction in a detector z direction in addition to data for the interaction in an x, y plane of the detection surface. A detector that is inherently able to do this is preferred.

In an embodiment a thick bulk semiconductor detector of cadmium zinc telluride (CZT) is used. Such a detector intrinsically allows for a depth of a photon interaction in a z direction as well as a location in a particular pixel in x, y to be determined. The invention is not limited to such detectors however. Such a semiconductor detector could be replaced by any "depth sensing" or "3D position sensing" detector structure, including for example scintillator detector modules made of a few layers to provide some depth sensing.

The embodiment utilises the thickness of the semiconductor detector to obtain a certain separation between the images from the neighbouring pinholes.

Figure 2:
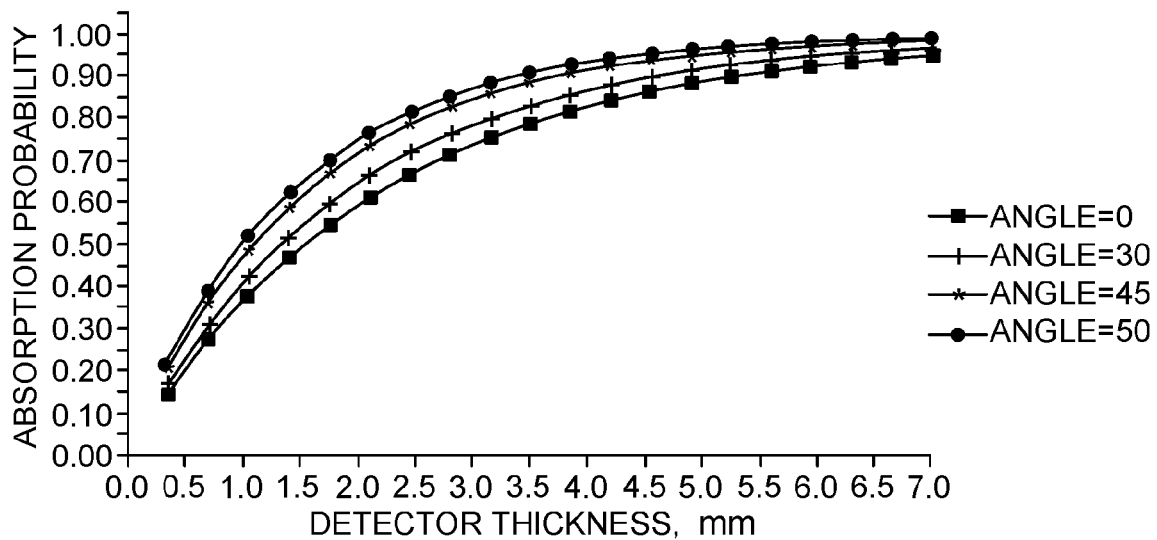
FIG. 2 is a plot of the absorption probability of photons directed at 7 mm thick CZT detector as a function of the photon angle measured from perpendicular direction.
Figure 3:
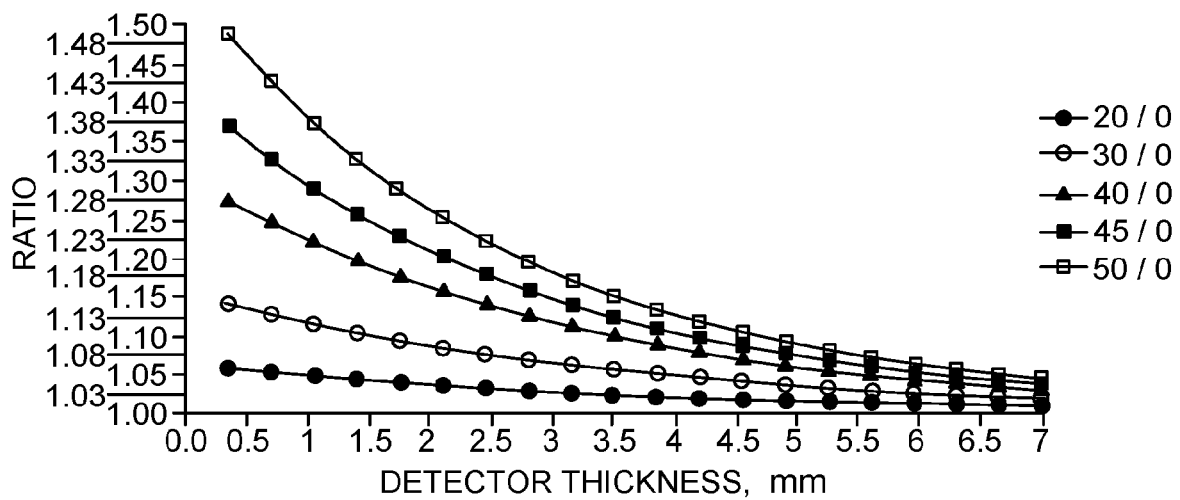
FIG. 3 is a plot of Ratio of absorption probabilities of photons coming at the detector at different angles to angle=0°, the ratios based on data from FIG. 2.

FIG. 2 shows the absorption probability of photons coming at a 7 mm thick CZT detector at various angles, while the angle is calculated relative to the vertical direction. FIG. 3 show the ratios of those probabilities normalized to absorption probability of photons coming at angle=0°. For example, we can see that for the photons coming at the angle=45° there is 35% higher probability to be absorbed within the first 0.5 mm of the detector comparing to the photons coming at the detector vertically. For the same photons, there would be approximately twice more of vertical photons absorbed in the second half of the detector.

A suitable processing and reconstruction module is used to deconvolve the three-dimensional interaction data and extract information accordingly, and for example to reconstruct an image. Since the x and y positions of interaction in the detector (with z being the dimension along the detector thickness) are also used in the image reconstruction, the method can use 3D position of interaction in the multi-pinhole collimator image reconstruction for reducing image artefacts due to multiplexing on images. That would allow increasing collimator efficiency potentially improving efficiency of image reconstruction for a low-signal source and/or allowing satisfactory imaging from a reduced signal source and, in the preferred case where the principle is applied to medical imaging and for example molecular breast imaging, ultimately decrease the patient dose.

This is a key advantage of the present invention. If the depth of each photon interaction, that is, the position in a z-direction within a deep detector, can also be resolved to some degree, a dataset may be produced in which each photon interaction can be localised positionally to some degree in all of the x, y and z co-ordinates, this will allow inferences to be drawn, and the dataset to be deconvolved by suitable reconstruction methods. Instead of a parallel hole collimator, a filter such as in the embodiment may be which may significantly reduce the number of photons which are prevented from passing the filter and thus significantly increase the proportion of photons which pass the filter to be usefully collected at the detection module and meaningfully processed. An effective set of data may be collected at the detection module with a much lower inherent source level of radioactivity, and for example in the case of medical imaging a consequent lower radiation dose into the patient's tissue.

The above is an example only. The principles of the invention could be applied to develop appropriate designs of collimator or other multiplexing filter combined with appropriate deconvolution techniques to solve particular problems, both in cases where use of the deconvolved data for the reconstruction of images might be required and where reconstruction of images is unnecessary or undesirable.

In particular, pinholes need not be identical, and multiplexing collimators with structures other than pinholes might be considered. Other multiplexing filters based on similar principles might make use of one or two dimensional arrays of apertures, including simple pinhole arrays and arrays of other parallel holes and slits, with relatively wide angular acceptance.

Collimators might be considered which change their properties, like the hole profile, dynamically during the measurement. This might lead to a possible case where the data in the detector is collected not simultaneously, for example when the collimator dynamically changes the angular acceptance of photons getting through it and then the final image is reconstructed using the whole data set, or even multiple data sets collected in different configurations.

Figure 4:
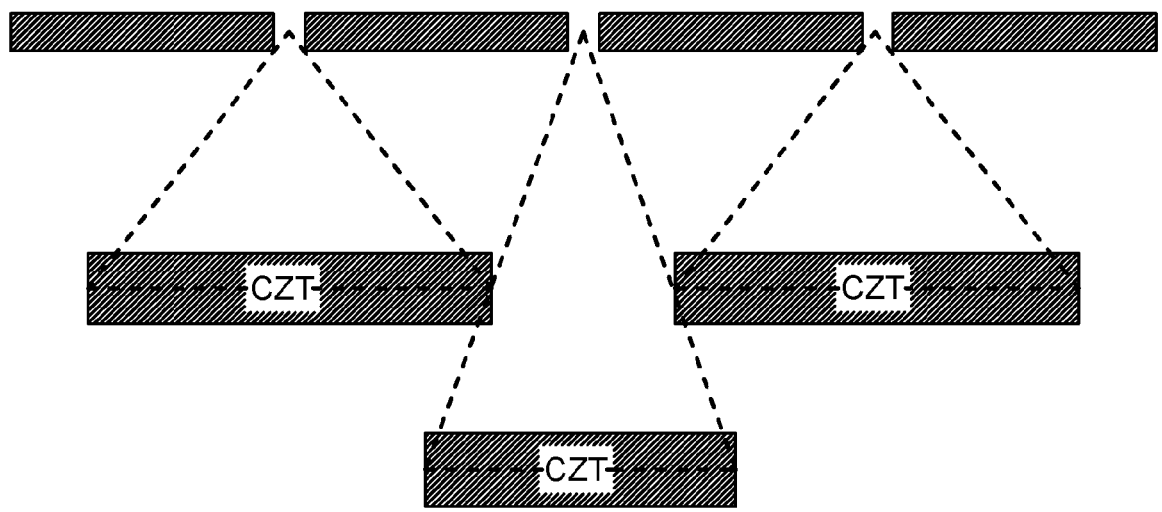
FIG. 4 is an additional idea to control the amount of multiplexing with multi-pinhole collimators.

Alternative arrangements to control the multiplexing in multi-pinhole collimation might be considered such as those shown in FIG. 4. The general principle is to stagger detectors comprising the detector array in such a way that each (or a few) collimator pinholes would illuminate only a sub-array of detection portions.

The invention claimed is:

1. A method of detecting radiation in a radiation pattern from a source comprising:
   positioning a detector to receive radiation from the source, wherein the detector is at least 5 millimeters in thickness;
   applying a multiplexing transformation to radiation from the source to create positional components in three dimensions in the pattern of radiation from the source;
   receiving a plurality of responses, each being responsive to an interaction with incident radiation occurring within the detector;
   determining, for each of the plurality of responses, a characteristic of the interaction, wherein the characteristic comprises at least a position in three dimensions of the interaction within the detector; and
   processing the said plurality of responses in accordance with the determined position in three dimensions of each interaction within the detector and drawing inferences therefrom regarding the pattern of radiation from the source.

2. The method of claim 1 wherein:
   the detector has a detector x, y plane and a detector z direction orthogonal thereto;
   applying the multiplexing transformation comprises introducing three dimensional positional components not only in a detector x, y plane, but also in a detector z direction;
   the method comprises localising each interaction not only in a detector x, y plane, but also in a detector z direction.

3. The method of claim 1 wherein the multiplexing transformation is operative on radiation from the source to add the positional components to the pattern of radiation from the source which has a nonzero variation with distance.

4. The method of claim 1 wherein the multiplexing transformation is not operative on radiation from the source to create a monotonic relationship in an x, y plane between a temporal order of radiation from the source and a temporal order of radiation arriving at the detector.

5. The method of claim 1 wherein the multiplexing transformation is effected in that radiation from the source is caused to pass through a multiplexing filter configured to create resolvable positional components in three dimensions to the pattern of radiation from the source as it passes the filter.

6. The method of claim 5 wherein the multiplexing filter comprises a discrete structure and is positioned between the source and the detector and configured to create resolvable positional components in three dimensions to the pattern of radiation from the source before it is incident upon the detector.

7. The method of claim 5 wherein the multiplexing filter is combined with the detector.

8. The method of claim 1 wherein the multiplexing transformation is effected by the detector in that the detector is adapted to perform the multiplexing transformation.

9. The method of claim 1 comprising the use of the detector adapted or configured to enable a particular interaction with incident radiation occurring within the detector to be localised to an interaction position within the detector in three dimensions.

10. The method of claim 9 comprising the use of the detector comprising a three-dimensional voxel array, wherein the determining, for each of the plurality of responses, a characteristic of the interaction including at least a position in three dimensions of the interaction comprises localising the said interaction to a particular voxel.

11. A radiation detection system for the detection of radiation in a radiation pattern from a source comprising:
   a detector, wherein the detector is at least 5 millimeters in thickness;
   a multiplexing transformer operable on radiation from the source to create positional components in three dimensions in the pattern of radiation from the source;
   a processing module operable to:
   receive a plurality of responses, each being responsive a response to an interaction with incident radiation occurring within the detector;
   determine, for each of the plurality of responses, a characteristic of the interaction, wherein the characteristic comprises at least a position in three dimensions of the interaction within the detector; and process the said plurality of responses in accordance with the determined position in three dimensions of each interaction within the detector and drawing inferences therefrom regarding the pattern of radiation from the source.

12. The system of claim 11 wherein:

the detector has a detector x, y plane and a detector z direction orthogonal thereto;

the multiplexing transformer is configured to be operable on radiation from the source, and positionable to be so operable, so as to introduce a three dimensional positional components not only in a detector x, y plane, but also in a detector z direction.

13. The system of claim 11 wherein the multiplexing transformer is operative on radiation from the source to add the positional components to the pattern of radiation from the source, wherein the pattern of radiation from the source has a nonzero variation with distance.

14. The system of claim 11 wherein the multiplexing transformer is not operative on radiation from the source to create a monotonic relationship in an x, y plane between a temporal order of radiation from the source and a temporal order of radiation arriving at the detector.

15. The system of claim 11 wherein the multiplexing transformer comprises an array of pinholes.

16. The system of claim 11 wherein the detector is adapted or configured to enable an interaction with incident radiation occurring within the detector to be localised to an interaction position within the detector in three dimensions.

17. The system of claim 11 wherein the detector is a voxel detector comprising a three-dimensional voxel array.

18. The system of claim 11 wherein the detector is a semiconductor detector.

19. The system of claim 18 wherein the semiconductor detector comprises a semiconductor detector material selected from cadmium telluride, cadmium zinc telluride (CZT), cadmium manganese telluride (CMT) and alloys thereof, and comprises crystalline $Cd_{1-(a+b)}Mn_aZn_bTe$ wherein a+b<1, and at least one of a and b is zero.

* * * * *